United States Patent
Seol et al.

(10) Patent No.: US 8,061,921 B2
(45) Date of Patent: Nov. 22, 2011

(54) INSERT-MOLDED BALL JOINT

(75) Inventors: Sang Hoon Seol, Busan (KR); Young Man Woo, Changwon-si (KR); Gi Yong Sung, Gimhae-si (KR)

(73) Assignees: Central Lingktec Co., Ltd, Ulsan (KR); Sang Hoon Seol, Busan (KR); Young Man Woo, Gyeongsangnam-Do (KR); Gi Yong Sung, Gyeongsangnam-Do (KR)

( * ) Notice: Subject to any disclaimer, the term of this patent is extended or adjusted under 35 U.S.C. 154(b) by 0 days.

(21) Appl. No.: 12/662,679

(22) Filed: Apr. 28, 2010

(65) Prior Publication Data

US 2011/0103883 A1 May 5, 2011

(30) Foreign Application Priority Data

Nov. 4, 2009 (KR) .................. 10-2009-0106050

(51) Int. Cl.
  *F16D 1/12* (2006.01)
(52) U.S. Cl. ........ 403/124; 403/125; 403/126; 403/133; 403/142
(58) Field of Classification Search ........... 403/122–144
See application file for complete search history.

(56) References Cited

U.S. PATENT DOCUMENTS

| | | | | |
|---|---|---|---|---|
| 5,092,703 A | * | 3/1992 | Kobayashi | 403/122 |
| 5,352,059 A | * | 10/1994 | Ueno et al. | 403/122 |
| 5,395,176 A | * | 3/1995 | Zivkovic | 403/122 |
| 5,860,757 A | * | 1/1999 | Sugiura | 403/128 |
| 6,139,788 A | * | 10/2000 | Dorr | 264/263 |
| 6,164,829 A | * | 12/2000 | Wenzel et al. | 403/135 |
| 6,231,264 B1 | * | 5/2001 | McLaughlin et al. | 403/135 |
| 6,398,446 B1 | * | 6/2002 | Pazdirek et al. | 403/134 |
| 2006/0140712 A1 | * | 6/2006 | Sun et al. | 403/135 |

FOREIGN PATENT DOCUMENTS

| | | |
|---|---|---|
| JP | 3-9113 | 1/1991 |
| JP | 2005-61537 | 3/2005 |
| KR | 10-0880844 | 3/2009 |

* cited by examiner

*Primary Examiner* — Victor MacArthur
(74) *Attorney, Agent, or Firm* — Wenderoth, Lind & Ponack, L.L.P.

(57) ABSTRACT

Disclosed herein is an insert-molded ball joint which is configured such that rotational frictional torque of a ball stud is kept below the appropriate level, pull-out strength of the ball stud is increased, and play of the ball stud is minimized. The ball stud has a spherical head. The spherical head of the ball stud is rotatably inserted into the ball seat. The housing covers the ball seat and a portion of the spherical head that is exposed from the ball seat. The upper end of the ball seat is disposed higher than the center of the spherical head. The housing includes a head support which covers the spherical head. A ball seat grease groove is formed in the inner surface of the ball seat. Housing grease grooves are formed in the head support in a vertical direction and meet the upper end of the ball seat.

5 Claims, 3 Drawing Sheets

[Fig. 1]
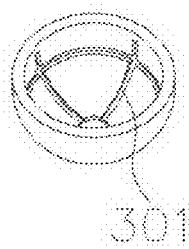
i)
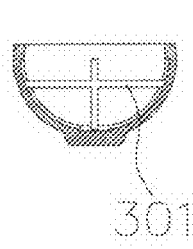
ii)
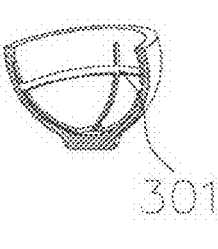
iii)
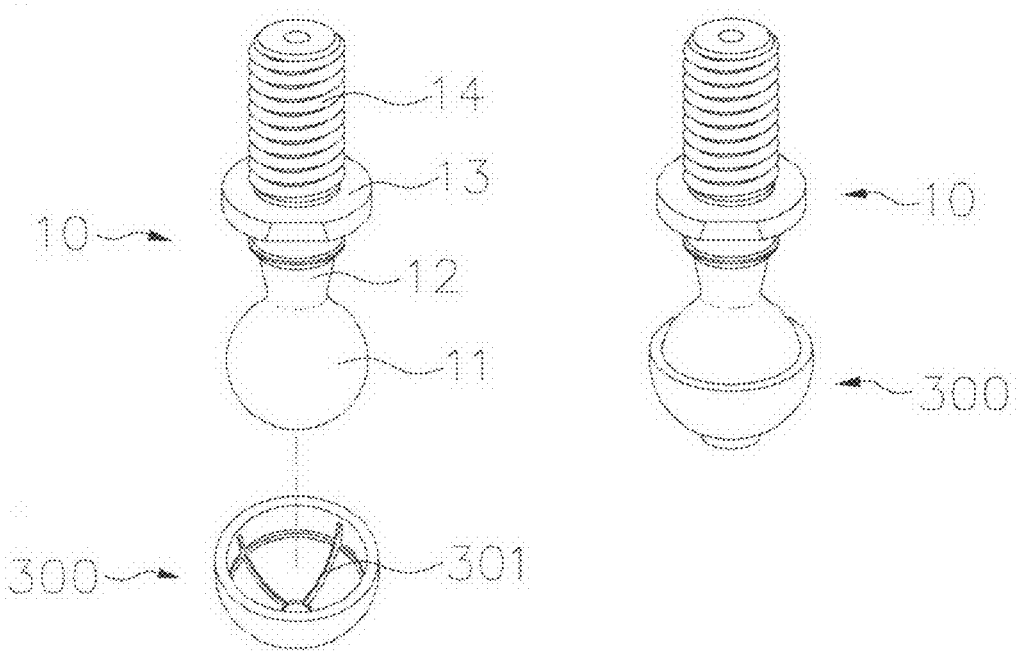
[Fig. 2]

[Fig. 3]
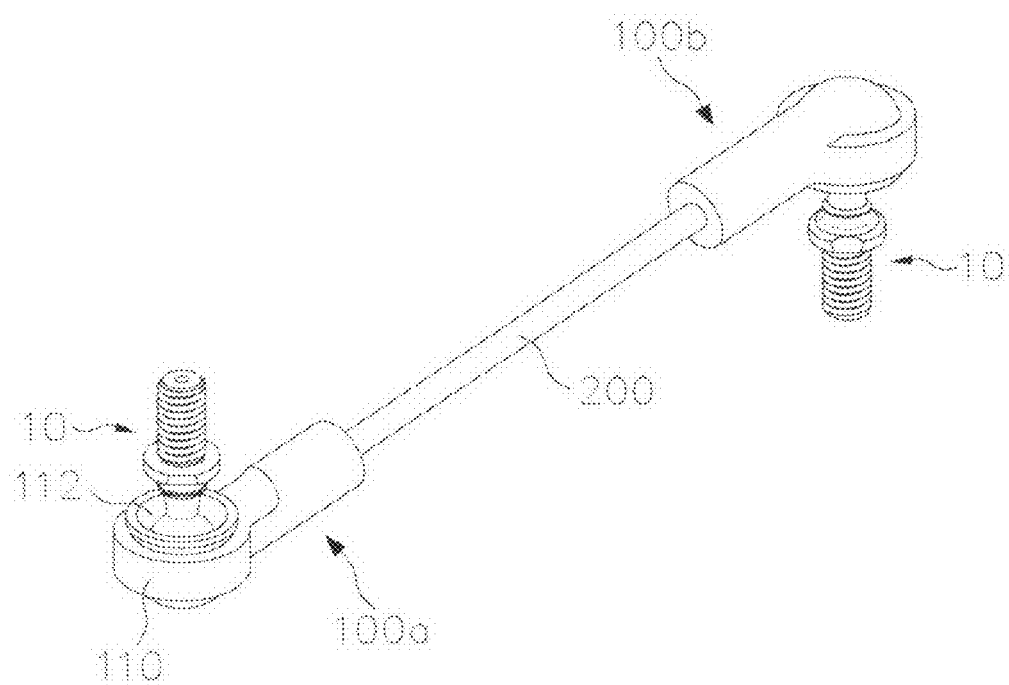
[Fig. 4]
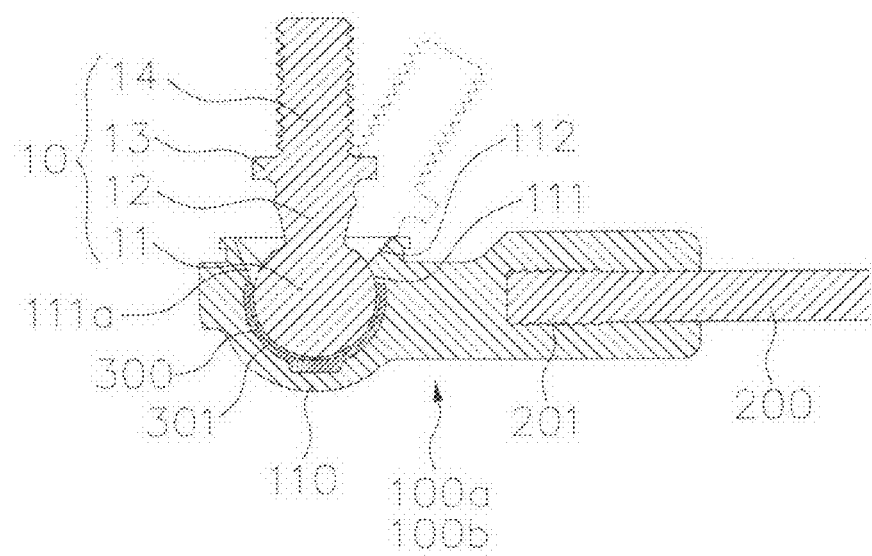

[Fig. 5]
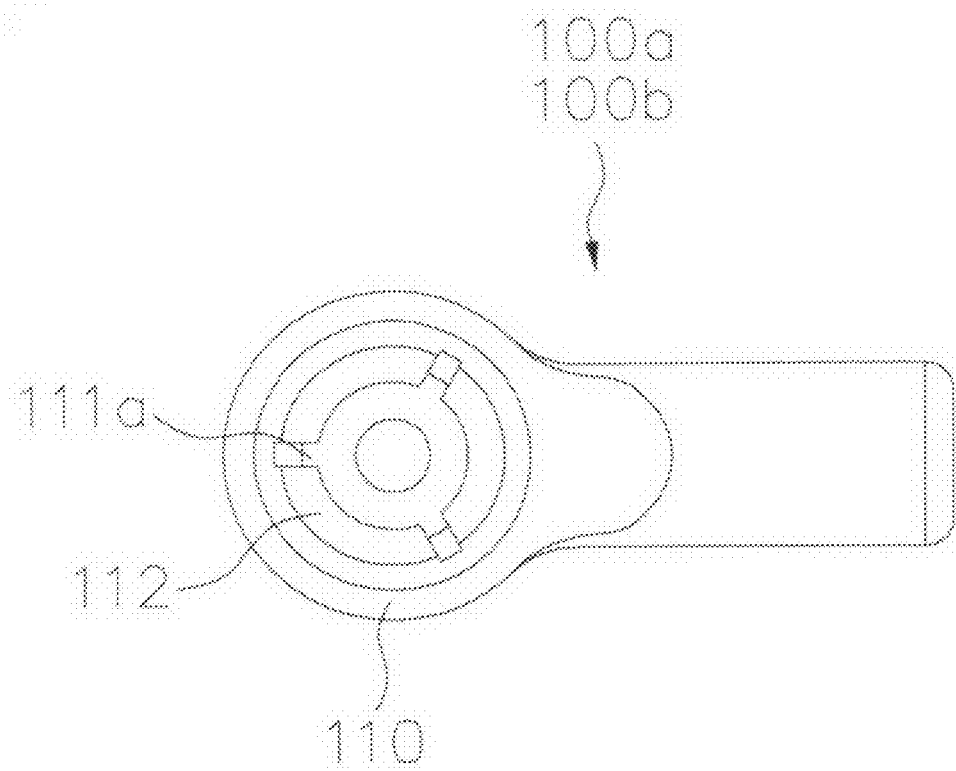
[Fig. 6]
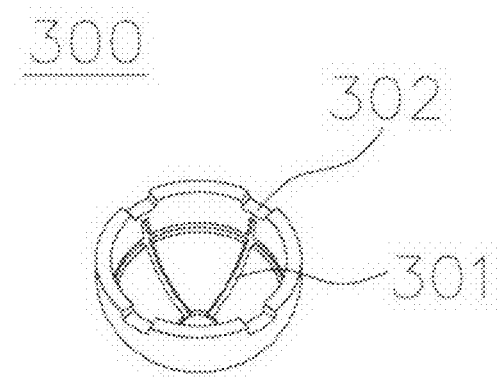

INSERT-MOLDED BALL JOINT

BACKGROUND OF THE INVENTION

1. Field of the Invention

The present invention relates generally to ball joints which are used in steering apparatuses or suspensions for vehicles and, more particularly, to a ball joint which is manufactured by insert molding.

2. Description of the Related Art

Generally, ball joints which are made only of metal and are manufactured in an assembly manner are widely used. Recently, insert-molded ball joints having housings made of synthetic resin have been proposed.

As techniques relevant to the present invention, representative examples of an insert-molded ball joint were proposed by the applicant of the present invention in Korean Patent Registration No. 10-0858689 (date: Sep. 9, 2008) which was entitled "Insert-molded ball joint having grease grooves and method of manufacturing the same" and in Korean Patent Registration No. 10-0880844 (date: Jan. 21, 2009) which was entitled "Insert-molded ball joint and method of manufacturing the same".

In the technique of No. 10-0858689, a ball stud is inserted into a mold and a housing is formed by injection molding, so that the housing and the ball stud come into direct contact with each other. In the technique of No. 10-0880844, after a spherical head of a ball stud is assembled with a ball seat, the ball stud and the ball seat are inserted into a mold and then a housing is formed by injection molding, so that the ball stud is separated from the housing by the ball seat.

The technique of No. 10-0858689 has an advantage of a simple manufacturing process but is problematic in that because the housing is formed on the ball stud by direct injection molding, rotational frictional torque of the ball stud with respect to the housing is relatively large.

On the other hand, in the technique of No. 10-0880844, because the ball stud rotates with respect to the ball seat, rotational friction torque of the ball stud is markedly reduced.

However, in the case of the ball joint of No. 10-0880844, resistance strength against a removal of the ball stud from the housing, in other words, pull-out strength, is relatively small. Furthermore, because the entirety of the spherical head of the ball stud is installed in the housing by the ball seat, there is a problem in that play of the ball stud is increased.

BRIEF SUMMARY OF THE INVENTION

Accordingly, the present invention has been made keeping in mind the above problems occurring in the prior art, and an object of the present invention is to provide an insert-molded ball joint which is configured such that rotational frictional torque of a ball stud is maintained under an appropriate level, pull-out strength of the ball stud is increased, and play of the ball stud is minimized.

In order to accomplish the above object, the present invention provides an insert-molded ball joint, including: a ball stud made of metal, the ball stud having a spherical head; a ball seat into which the spherical head of the ball stud is rotatably inserted, the ball seat being made of synthetic resin; a housing formed by injection molding using synthetic resin, the housing covering the ball seat and a portion of the spherical head of the ball stud that is exposed from the ball seat. An upper end of the ball seat is disposed higher than an imaginary horizontal plane passing through a center of the spherical head of the ball stud. The housing comprises a head support extending from the upper end of the ball seat and covering the spherical head of the ball stud to prevent the ball stud from being removed from the housing. A ball seat grease groove is formed in an inner surface of the ball seat, the ball seat grease groove being sealed with the spherical head of the ball stud. A plurality of housing grease grooves is formed in the head support of the ball stud in a vertical direction. The housing grease grooves come in contact with the upper end of the ball seat.

The insert-molded ball joint may further include a connection bar embedded at one end thereof by insert molding in a housing body in which the housing is formed, with a knurled portion formed on the end of the connection bar.

Furthermore, a plurality of notches may be formed in the upper end of the ball seat.

BRIEF DESCRIPTION OF THE DRAWINGS

The above and other objects, features and advantages of the present invention will be more clearly understood from the following detailed description taken in conjunction with the accompanying drawings, in which:

FIG. 1 is of a perspective view, a sectional view and a sectional perspective view showing a ball seat, according to an embodiment of the present invention;

FIG. 2 is of views illustrating the coupling of a ball stud to the ball seat according to the embodiment of the present invention;

FIG. 3 is a perspective view of a ball joint including a housing provided with the ball seat and the ball stud of FIG. 2;

FIG. 4 is a sectional view of a critical portion of FIG. 3;

FIG. 5 is a plan view illustrating the housing of FIG. 4; and

FIG. 6 is a perspective view showing a ball seat according to a modification of the embodiment of the present invention.

DETAILED DESCRIPTION OF THE INVENTION

Hereinafter, a preferred embodiment of the present invention will be described in detail with reference to the attached drawings, such that those skilled in the art can easily implement the present invention. The present invention is realized in various manners and is not limited to the following embodiment. Reference is made to the drawings, in which similar reference numerals are used throughout the different drawings to designate similar components.

In the specification, when the explanatory phrase "a part includes a component" is used, this means that the part may further include the component without excluding other components, so long as special explanation is not given.

FIG. 1 is of a perspective view, a sectional view and a sectional perspective view showing a ball seat 300, according to an embodiment of the present invention. FIG. 2 is of views illustrating the coupling of a ball stud 10 to the ball seat 300 according to the embodiment of the present invention. FIG. 3 is a perspective view of a ball joint including a housing 110 provided with the ball seat 300 and the ball stud 10 of FIG. 2. FIG. 4 is a sectional view of a critical portion of FIG. 3. FIG. 5 is a plan view illustrating the housing 110 of FIG. 4.

As shown in FIG. 2, the ball stud 10 used in the embodiment of the present invention has the same structure as that of the ball stud of the conventional technique. In other words, the ball stud 10 of the present invention is also made of metal and integrally includes a spherical head 11, a neck 12, a flange 13 and a threaded part 14.

As shown in FIG. 1, the ball seat 300 has a hemispherical shape such that the spherical head 11 of the ball stud 10 is rotatably seated into the ball seat 300. The ball seat 300 is formed by injection molding using synthetic resin.

Ball seat grease grooves 301 are formed in the inner surface of the ball seat 300.

The ball seat grease grooves 301 are filled with grease before the ball stud 10 is assembled with the ball seat 300.

The ball seat 300 is configured such that the upper end thereof is positioned higher than an imaginary horizontal plane passing through the center of the spherical head 11 of the ball stud 10. In other words, the ball seat 300 is configured such that half or more of the spherical head 11 of the ball stud 10 is inserted into the ball seat 300. Due to this structure, after the spherical head 11 of the ball stud 10 is assembled with the ball seat 300, the coupling between the ball stud 10 and the ball seat 300 can be reliably maintained.

Furthermore, some of the ball seat grease grooves 301 extend from the center of the inner surface of the ball seat 300 in radial directions, and the other ball seat grease grooves 301 extend in the inner surface of the ball seat 300 at a medium height in the horizontal direction. Here, the upper ends of the ball seat grease grooves 301 are disposed lower than the upper end of the ball seat 300. Therefore, when the spherical head 11 of the ball stud 10 is assembled with the ball seat 300, the ball seat grease grooves 301 are sealed by the spherical head 11 of the ball stud 10.

The ball stud 10 is coupled to the ball seat 300 in such a way as to fit the spherical head 11 of the ball stud 10 into the ball seat 300 having the above-mentioned structure.

After the ball stud 10 is coupled to the ball seat 300, the housing 110 is formed by insert injection molding.

The outer surface of the ball seat 300 and a portion of the spherical head 11 of the ball stud 10 which is exposed from the ball seat 300 come into direct contact with synthetic resin for the housing 110 formed by injection molding.

Here, because the ball seat grease grooves 301 of the ball seat 300 are sealed by the spherical head 11 of the ball stud 10, the synthetic resin for the housing 110 is prevented from entering the ball seat grease grooves 301.

FIG. 3 is a perspective view of the ball joint formed through the above-mentioned process. FIG. 4 is a sectional view of the critical portion of FIG. 3.

In the embodiment, two ball seats 300 which are respectively assembled with ball studs 10 are disposed in molds (in other words, the ball seats 300 and the ball studs 10 are disposed in the molds such that they define spaces for molding). Thereafter, a connection bar 200 is provided such that both ends thereof are disposed in the molds. Subsequently, housing bodies 100a and 100b are formed through an injection molding process.

Of course, as necessary, the ball joint may be configured such that the two ball seats assembled with the ball studs are installed in a single housing body without using the connection bar 200.

Furthermore, as necessary, the ball joint may be formed in such a manner that the second housing body 100b is formed by injection molding after the first housing body 100a is formed by injection molding.

In this embodiment, the two housing bodies 100a and 100b made of synthetic resin are oriented in opposite directions. The two housing bodies 100a and 100b are connected to each other by the connection bar 200 made of metal.

In addition, knurled portions 201 are formed on both ends of the connection bar 200 to enhance the coupling force between the connection bar 200 and the housing bodies 100a and 100b, in other words, to prevent the connection bar 200 from being removed from the housing body 100a or 100b.

Of course, in place of the knurled portions 201, threads or stoppers may be formed on both ends of the connection bar 200 to achieve the same purpose as that of the knurled portions 201.

The housing 110 in which the ball seat 300 and the spherical head 11 of the ball stud 10 are installed is formed in each of the housing bodies 100a and 100b.

As shown in FIG. 4, the housing 110 covers the ball seat 300 in addition to the portion of the spherical head 11 of the ball stud 10 that is exposed from the ball seat 300.

Preferably, the housing 110 includes a head support 111 and a neck support 112.

The head support 111 is a portion of the housing 110 which covers the spherical head 11 of the ball stud 10. The neck support 112 is a portion of the housing 110 which supports the neck 12 of the ball stud 10.

The head support 111 formed in the housing 110 is in contact with only a portion of the spherical head 11 of the ball stud 10 to prevent the rotational friction torque of the ball stud 10 from excessively increasing. In other words, when the spherical head 11 of the ball stud 10a rotates, a half or more of the spherical head 11 is in a state of being supported by the ball seat 300. Therefore, the rotational frictional torque of the ball stud 10 can be kept below a predetermined level.

Moreover, the head support 111 reliably and tightly supports the spherical head 11 of the ball stud 10, thus preventing the ball stud 10 from playing when it rotates.

Furthermore, the head support 111 of the housing 110 prevents the spherical head 11 of the ball stud 10 from being undesirably removed from the housing 110. Hence, pull-out strength of the ball stud 10 is increased.

Meanwhile, as shown in FIGS. 4 and 5, three housing grease grooves 111a which extend predetermined lengths in the vertical direction are formed in the head support 111 at positions spaced apart from each other at regular intervals. The lower ends of the housing grease grooves 111a meet the upper end of the ball seat 300.

In terms of the quality of the product, the housing grease grooves 111a are filled with grease so that the spherical head 11 of the ball stud 10 can smoothly rotate with respect to the head support 111.

In terms of the process of manufacturing the product, when the housing 110 is formed by injection molding, the housing grease grooves 111a prevent the ball seat 300 from rotating with respect to the spherical head 11 of the ball stud 10.

In detail, to form the housing grease grooves 111a in the head support 111, a mold which can form the housing grease grooves 111a when the housing is formed by injection molding is required. This mold comes into contact with the upper end of the ball seat 300. Therefore, when the housing 110 is formed by injection molding, the ball seat 300 is maintained in a state of being supported by the mold.

If the ball seat 300 is not supported by the mold, in other words, if the housing grease grooves 111a are not formed in the housing 110, the ball seat 300 may undesirably rotate with respect to the spherical head 11 of the ball stud 10 due to pressure of synthetic resin injected into the mold and be displaced from its correct position.

FIG. 6 is a perspective view showing a ball seat 300, according to a modification of the embodiment of the present invention.

As shown in FIG. 6, notches 302 are formed in the upper end of the ball seat 300 at positions spaced apart from each other at regular intervals.

Due to this shape of the ball seat 300, during an injection molding process, a housing 110 is formed after synthetic resin enters the notches 302. Thus, the ball seat 300 is prevented from rotating with respect to the housing 110.

Furthermore, thanks to the notches 302 formed in the upper end of the ball seat 300, when the spherical head 11 of the ball stud 10 is assembled with the ball seat 300, the diameter of the upper end of the ball seat 300 can be easily extended, so that the assembly of the ball stud 10 with the ball seat 300 is facilitated.

As such, the shape of the ball seat can be modified in various manners.

As described above, in an insert-molded ball joint according to the present invention, a spherical head of a ball stud rotates with respect to a ball seat in a state in which a portion of the spherical head is supported by the ball seat. Thus, rotational frictional torque of the ball stud can be kept below an appropriate level. Furthermore, because the ball stud is supported by a head support of the housing, the pull-out strength of the ball stud can be increased, and the play of the ball stud when it rotates can be minimized.

In addition, when a housing is formed by injection molding, a mold comes into contact with the ball seat through housing grease grooves formed in the ball seat. Hence, the ball seat can be prevented from undesirably rotating around the spherical head of the ball stud during the injection molding process.

Although the preferred embodiment of the present invention has been disclosed, those skilled in the art will appreciate that various modifications, additions and substitutions are possible, without departing from the scope and spirit of the invention as disclosed in the accompanying claims. Therefore, it should be understood that the preferred embodiment is only for illustrative purposes and does not limit the bounds of the present invention. For instance, components which have been illustrated as being integrated with each other may be implemented in a separate structure, and components which have been illustrated as being separately provided may be provided in an integrated structure.

Therefore, it is to be interpreted that the bounds of the present invention are defined by the accompanying claims, and various modifications, additions and substitutions, which can be derived from the meaning, scope and equivalent concepts of the accompanying claims, fall within the bounds of the present invention.

What is claimed is:

1. An insert-molded ball joint, comprising:
   a ball stud made of metal, the ball stud having a spherical head;
   a ball seat into which the spherical head of the ball stud is rotatably inserted, the ball seat being made of synthetic resin;
   a housing formed by injection molding using synthetic resin, the housing covering the ball seat and a portion of the spherical head of the ball stud that is exposed from the ball seat,
   wherein an upper end of the ball seat is disposed higher than an imaginary horizontal plane passing through a center of the spherical head of the ball stud,
   the housing comprises a head support extending from the upper end of the ball seat and contacting an upper portion of the spherical head of the ball stud to prevent the ball stud from being removed from the housing,
   a ball seat grease groove is formed in an inner surface of the ball seat, the ball seat grease groove being sealed with the spherical head of the ball stud, and
   a plurality of housing grease grooves are formed in the head support of the ball stud in a vertical direction, the plurality of housing grease grooves being in contact with the upper end of the ball seat.

2. The insert-molded ball joint as set forth in claim 1, further comprising:
   a connection bar embedded at one end of the housing by insert molding in a housing body in which the housing is formed, with a knurled portion formed on an end of the connection bar.

3. The insert-molded ball joint as set forth in claim 1, wherein a plurality of notches are formed in the upper end of the ball seat.

4. The insert-molded ball joint as set forth in claim 1, wherein the housing is formed by using a mold during the injection molding, and the mold contacts the upper end of the ball seat and prevents the ball seat from rotating around the spherical head of the ball stud during the injection molding.

5. The insert-molded ball joint as set forth in claim 1, wherein the housing is formed by using a mold during the injection molding, and a portion of the mold which forms the housing grease grooves contacts the upper end of the ball seat and prevents the ball seat from rotating around the spherical head of the ball stud during the injection molding.

* * * * *